United States Patent [19]

Kaneko

[11] Patent Number: 5,388,203
[45] Date of Patent: Feb. 7, 1995

[54] FUNCTION EXTRACTION METHOD AND APPARATUS

[75] Inventor: Satomi Kaneko, Tokyo, Japan

[73] Assignee: Kabushiki Kaisha Toshiba, Kawasaki, Japan

[21] Appl. No.: 858,878

[22] Filed: Mar. 27, 1992

[30] Foreign Application Priority Data

Mar. 29, 1991 [JP] Japan ............... 3-065159

[51] Int. Cl.⁶ ............... G06F 3/14
[52] U.S. Cl. ............... 395/159; 395/157; 395/161
[58] Field of Search ............... 395/161, 157, 158, 159, 395/155

[56] References Cited

U.S. PATENT DOCUMENTS

| | | | |
|---|---|---|---|
| 5,140,677 | 8/1992 | Fleming et al. | 395/157 X |
| 5,214,756 | 5/1993 | Flanklin et al. | 395/159 |
| 5,241,655 | 8/1993 | Mineki et al. | 395/159 X |

*Primary Examiner*—Heather R. Herndon
*Assistant Examiner*—Cliff N. Vo
*Attorney, Agent, or Firm*—Banner, Birch, McKie & Beckett

[57] ABSTRACT

A function extraction apparatus comprises a display device for displaying a plurality of icons indicative of functions, an input device for selectively designating the icons displayed on the display device, an operator icon storage for storing information of operator icons each designated as an operator by the input device, an operand icon storage for storing information of operand icons each designated as an operand by the input device, an icon/attribute knowledge section for storing the attributes of operator and operand functions of each of all usable objects, and an function inference section for inferring the function, on the basis of the object information stored in the operator and operand icon storages and the knowledge information stored in the icon/attribute knowledge section.

15 Claims, 9 Drawing Sheets

```
{(drawer
    (name (value (REPORTS))
    (role (value (operator))))
 (pencil
    (name (value (EDITOR))
    (role (value (operand))))}

(a) DRAWER = OPERATOR
    PENCIL  = OPERAND

{(pencil
    (name (value (PENCIL)))
    (role (value (operator))))
 (drawer
    (name (value (REPORTS)))
    (role (value (operand))))}

(b) PENCIL = OPERATOR
    DRAWER = OPERAND

{(drawer
    (name (value (REPORTS)))
    (role (value (operator))))
 (trash_box
    (name (value (TRASH_BOX)))
    (role (value (operand))))}

(c) DRAWER    = OPERATOR
    TRASH BOX = OPERAND

{(trash_box
    (name (value (TRASH_BOX)))
    (role (value (operator))))
 (drawer
    (name (value (REPORTS)))
    (role (value (operand))))}

(d) TRASH BOX = OPERATOR
    DRAWER    = OPERAND
```

FIG. 6

```
(pencil
    (operator_role (value (text_edit)))
    (operand_role  (value (tool))))      -----(a1)
(drawer
    (operator_role (value (contain)))    -----(a2)
    (operand_role  (value (container))))
(trash_box
    (operator_role (value (delete)))
    (operand_role  (value (container))))
```

FIG. 7

```
{(iconA = drawer
    (^role          operator)
    (^operator_role contain))
 (iconB = pencil
    (^role          operand)
    (^operand_role  tool)
    (^name          <appli_name>))
 ->
    quit <appli_name>;}                    RULE 1

{(iconA
    (^role          operator)
    (^operator_role text-edit))
 (iconB
    (^role          operand)
    (^operand_role  container)
    (^name          <dir_name>))
 ->
    edit <dir_name>;}                      RULE 2

{(iconA
    (^role          operator)
    (^operator_role contain)
    (^name          <dir_name_A>))
 (iconB
    (^role          operand)
    (^operand_role  container)
    (^name          <dir_nameB>))
 ->
    move<dir_nameB><dir_nameA>;}           RULE 3

{(iconA
    (^role          operator)
    (^operator_role delete))
 (iconB
    (^role          operand)
    (^operand_role  container)
    (^instance      <dir_name>))
 ->
    del<dir_name>;}                        RULE 4
```

FIG. 8

| COMBINATION OF PICTOGRAMS | DISCRIMINATE RESULT | | | DESIGNATED CONTENT MEMORY |
|---|---|---|---|---|
| | OBJECT | PICTOGRAMS | ROLE | |
| | REPORTS | drawer | operator (sub) | (drawer (name (value(REPORTS))---D1 (role (value(operator))---D3 (pencil (name (value(EDITOR))---P1 (role (value(operand))---P3 (a) DRAWER = OPERATOR PENCIL = OPERAND |
| | EDITOR | pencil | operand (ob) | |
| | EDITOR | pencil | operator (ob) | (pencil (name (value(EDITOR))---P1 (role (value(operator))---P3 (drawer (name (value(REPORTS))---D1 (role (value(operand))---D3 (b) PENCIL = OPERATOR DRAWER=OPERAND |
| | REPORTS | drawer | operand (sub) | |

FIG. 9A

| PICTOGRAM ATTRIBUTE KNOWLEDGE | FUNCTION EXECUTION RULE |
|---|---|
| (drawer<br>(operator_role (value(contain)))---DS<br>(pencil<br>operand_role (value(tool))) ---P0 | {(iconA = drawer<br>(^role operator) ---D3<br>(^operator_role contain))---DS<br>(iconB = pencil<br>(^role operand) ---P3<br>(^operand_role tool) ---P0<br>(^name ⟨appli_name⟩)) ---P1<br>-⟩ quit ⟨appli_name⟩;} |
| (pencil<br>(operator_role (value(text_edit))---PS<br>(drawer<br>(operand_role (value(container)))--D0 | {(iconA = pencil<br>(^role operator) ---P3<br>(^operator_role text_edit))--PS<br>(iconB = drawer<br>(^role operand) ---D3<br>(^operand_role container) ---D0<br>(^name ⟨dir_name⟩)) ---D1<br>-⟩ edit ⟨dir_name⟩;} |

F I G. 9B

FUNCTION EXTRACTION METHOD AND APPARATUS

BACKGROUND OF THE INVENTION

1. Field of the Invention

This invention relates to a function extraction method and apparatus for extracting a desired system function based on an icon, etc., selected on the display of a computer system.

2. Description of the Related Art

In one of extraction systems for extracting a desired system function by selecting an icon from an icon group displayed on the display of a computer system, an icon representative of an operand function (object) is overlapped upon an icon representative of an operator function (subject) for executing the function.

In the system, for example, a "document" icon indicative of a document file is overlapped upon a "trash box" icon indicative of deletion, thereby extracting a function of "deleting the document file". The operation executed by overlapping the icons corresponds to such a daily operation as "putting an unnecessary thing into a trash box", and also corresponds to the operation of "taking something out of the trash box".

Accordingly, where two "things" are combined with each other in daily life, it depends upon the circumstances which one of the two things is the operator (or operand) and which is the object of working. For example, in the combination of a "pencil" and a "container", the function of "writing in an index" is recalled if the "pencil" is the operator and the "container" is the operand, whereas the function of "containing the pencil" is recalled if the "container" is an operator and the "pencil" is an operand.

In the conventional function extraction system using icons, however, it is determined whether each icon has an operator function or an operand function, so that it is difficult to perform such a flexible function extraction as is suitable for patterns of thought and behavior in daily life. Thus, knowledge concerning a desired icon operation to be extracted must be acquired newly.

SUMMARY OF THE INVENTION

It is the object of the invention to provide a function extraction method and apparatus capable of extracting, in a flexible manner, functions suitable for thought and behavior patterns of men.

According to the invention, there is provided a function extraction apparatus which comprises a display device for displaying a plurality of objects indicative of functions; a designation section for selectively designating the objects displayed on the display device; an operator object memory for storing information of an operator object designated as the operator of a function by means of the designation section; an operand object memory for storing information of an operand object designated as the operand of the function by means of the designation section; a knowledge storage section for storing the attributes of operator and operand functions of each of all usable objects; and an inference section for inferring the function, on the basis of the object information stored in the operator and operand object storage memories.

According to the invention, there is provided a function extraction apparatus comprising:

output process means for displaying a plurality of icons having respective pictograms;

input means for selectively designating at least two from the icons displayed by the output process means, and generating input information corresponding to the designated icons;

designated content-discriminating means for discriminating objects, their pictograms and roles corresponding to at least two icons designated based on the input information supplied from the input means, and the roles of the pictograms;

transforming means for transforming the discriminated objects, their pictograms and roles into predetermined information, and outputting the form as designated-content information;

designated content-memory means for storing the designated-content information;

knowledge base means including pictogram attribute knowledge means for storing, as attribute knowledge, the functional role of each of reference pictograms, and function rule knowledge means for storing a plurality of function rules each defining a function to be executed, on the basis of the reference pictograms and attribute knowledge; and function designating means for designating a function to be executed, on the basis of the relationship between the roles of two objects corresponding to at least two icons designated by using the designated-content memory means and knowledge base means.

According to the invention, there is provided a function extraction method comprising:

a step for displaying a plurality of icons having respective pictograms;

a step for selectively designating at least two from the icons displayed, and generating input information corresponding to the designated icons;

a step for discriminating objects, their pictograms and roles corresponding to at least two icons designated based on the input information supplied, and the roles of the pictograms;

a step for transforming the discriminated objects, their pictograms and roles into predetermined information, and outputting the form as designated-content information;

a step for storing the designated-content information;

a step for storing, as attribute knowledge, the functional role of each of reference pictograms, and storing a plurality of function rules each defining a function to be executed, on the basis of the reference pictograms and attribute knowledge; and a step for designating a function to be executed, on the basis of the relationship between the roles of two objects corresponding to at least two icons designated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a view, showing information stored in a designated content memory;

FIG. 7 is a view, showing information stored in a pictogram attribute knowledge section;

FIG. 8 is a view, showing information stored in a function extraction rule memory.

DETAILED DESCRIPTION OF THE PREFERRED EMBODIMENTS

Figure 1:
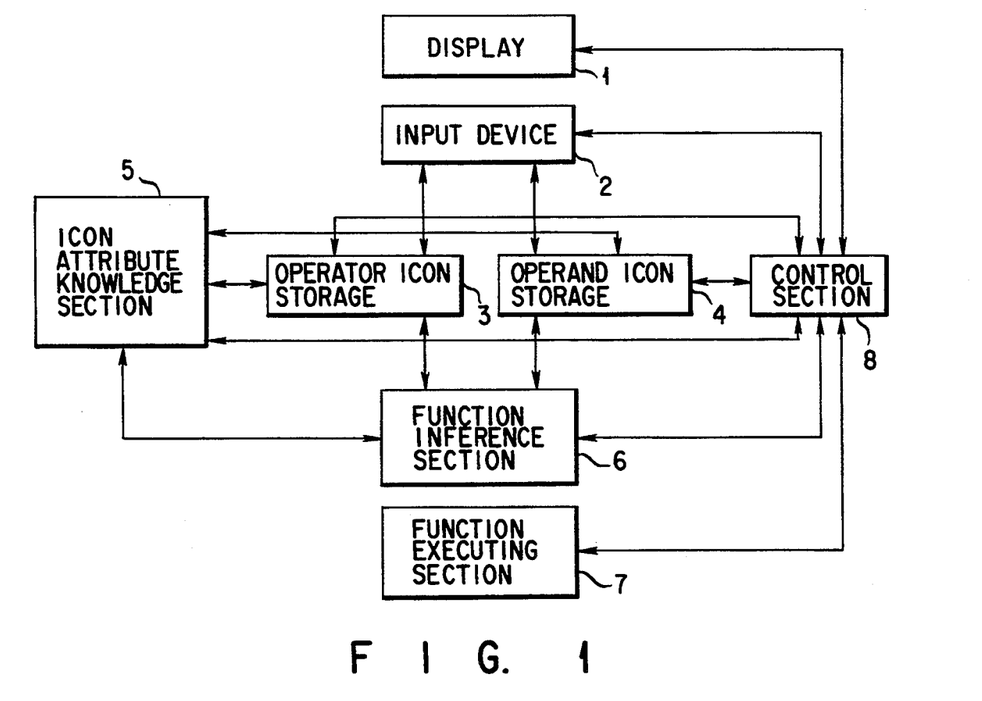
FIG. 1 is a block diagram, showing a function extraction apparatus according to an embodiment of the invention.

As is shown in FIG. 1, a display device 1 comprises a CRT display, etc., capable of displaying objects (hereinafter each called "icon") representative of functions of a computer. An input device 2 comprises a mouse, a keyboard, and the like, for selectively designating a plurality of icons displayed on the display device 1. The input device 2 selects, on the display, an icon serving as the operator, or subject, of a function and an icon serving as the operand, or object, (indicative of a thing or a tool) of the function, and partially overlaps the operand icon upon the operator icon, thereby selecting and executing the function.

The input device 2 is connected to an operator icon storage 3 for storing the name of the icon selected as the operator, and to an operand icon storage 4 for storing the name of the icon selected as the operand. An icon attribute knowledge section 5 is connected to the operator and operand icon storages 3 and 4, and also to a function inference section 6, and stores, as knowledge data, the attributes of the operator and operand functions of each of all icons usable in the system. The function inference section 6 is connected to the operator and operand icon storages 3 and 4, for inferring a system function from those data stored in the icon attribute knowledge section 5 which correspond to the icon names stored in the storages 3 and 4. A function execution section 7 executes the function obtained from the function inference section 6.

A controlling section 8 is connected to the above elements 1-7, for controlling the overall apparatus, e.g. controlling data input and output between the elements.

The operation of the function extraction apparatus constructed as above will be explained in detail.

Assume that two icons indicating "pencil" and "drawer" are selected by the user as an operand and an operator, respectively, from a plurality of icons displayed on the display 1. Then, the icon names "drawer" and "pencil" are stored in the operator icon storage 3 and operand icon storage 4, respectively.

Figure 2:
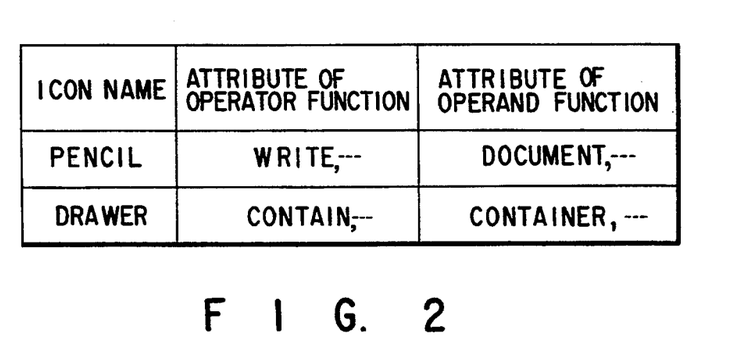
FIG. 2 is a view, showing an example of data stored in an icon attribute knowledge section.

The icon attribute knowledge section 5 stores knowledge corresponding to the "pencil" and "drawer", as is shown in FIG. 2.

The function inference section 6 infers, in the following manner, a system function corresponding to the icon names stored in the operator and operand icon storages 3 and 4, on the basis of knowledge stored in the icon attribute knowledge section 5.

If the icon "drawer" is the operator, then "to contain" is the operator function, and if the icon "pencil" is the operand, then "document" is the operand function. Thus, the function inference section 6 extracts the function of "terminating edit of document" from the display, and the function execution section 7 executes the function.

On the other hand, if the icons "pencil" and "drawer" are designated as operator and operand, respectively, the function inference section 6 judges that "to write" is the operator function and "container unit" is the operand function. As a result, the section 6 extracts the function of "writing directory name" from the display.

As described above, in the function extraction apparatus according to the embodiment, each icon has functions serving as operator and operand, respectively, and any desired system function can be extracted by inference based on an icon designated as operator, thereby performing flexible function extraction suitable for thought and behavior patterns of men.

Figure 3A:
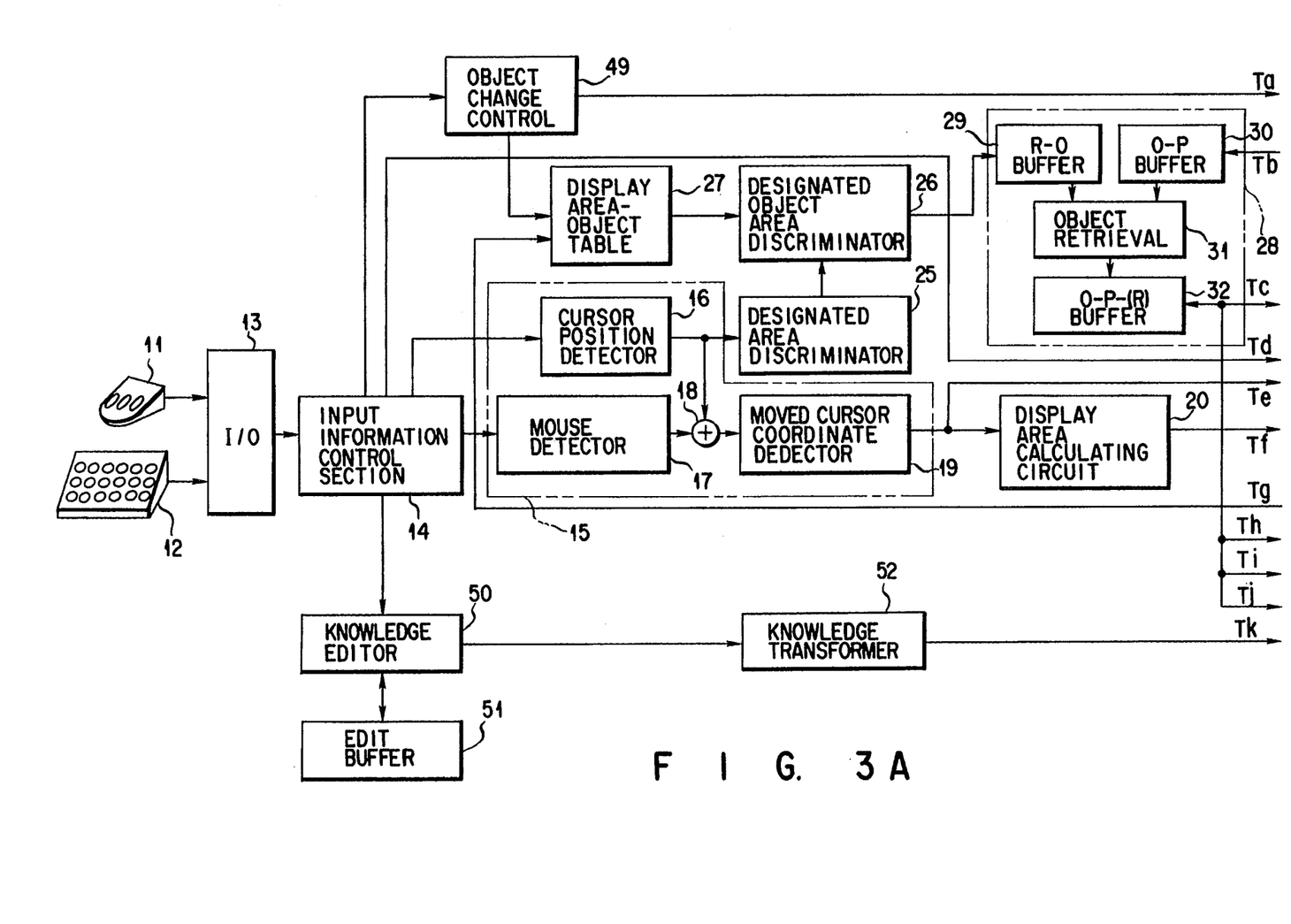
FIGS. 3A and 3B are block diagrams, showing a function extraction apparatus according to another embodiment of the invention.
Figure 3B:
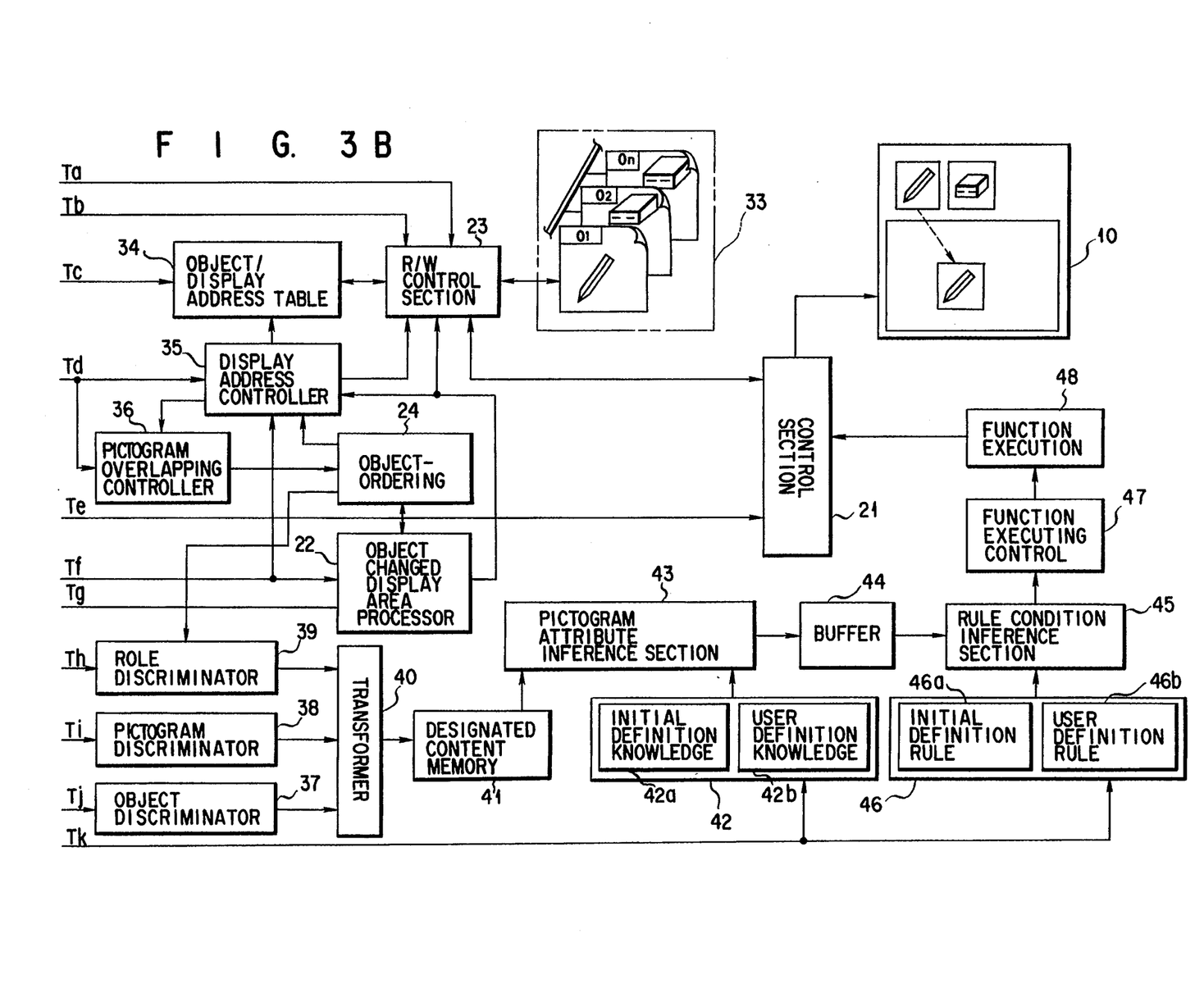
Figure 4:
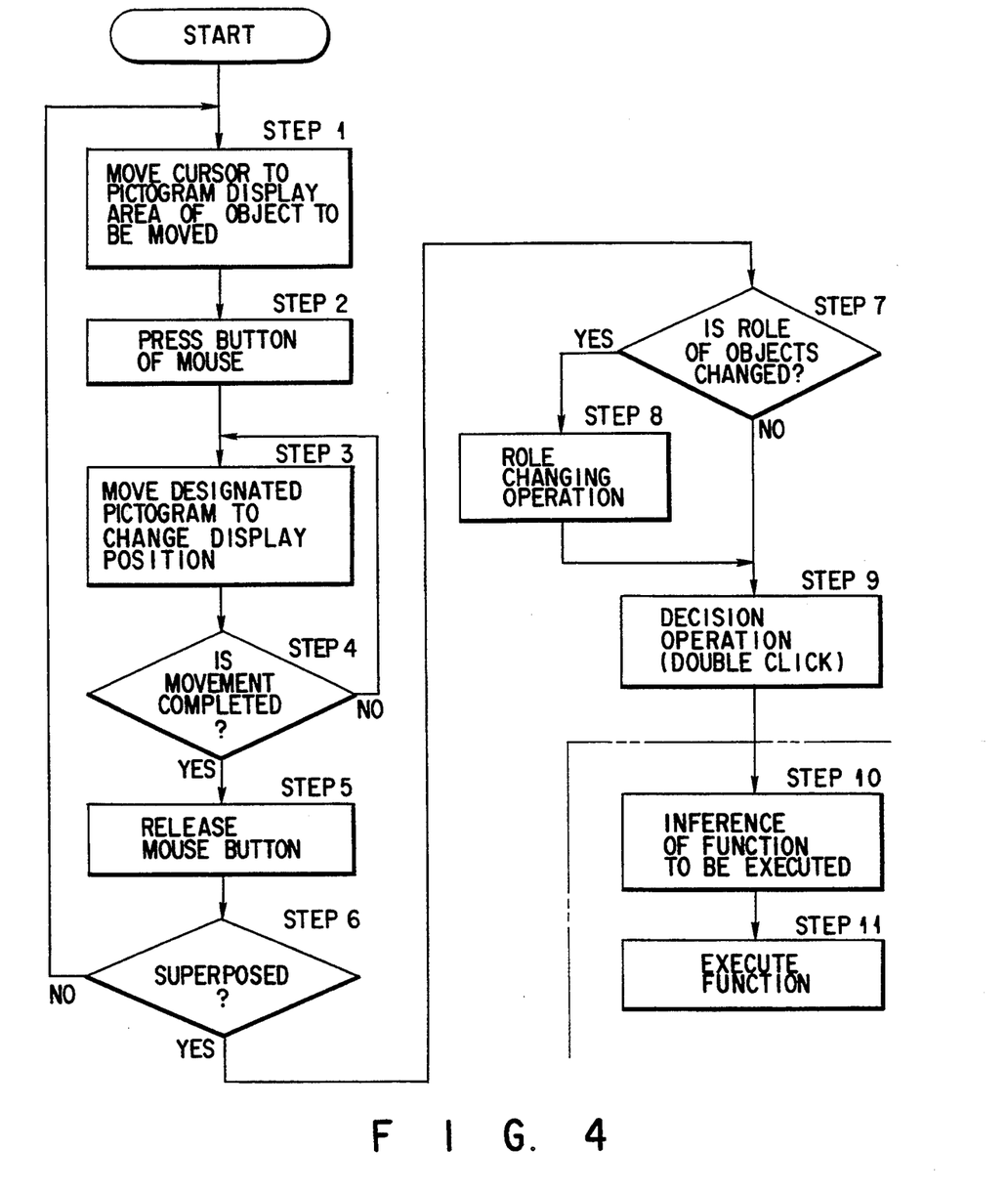
FIG. 4 is a flowchart, useful in explaining the operation of the function extraction apparatus of FIG. 3.

Then, another embodiment will be explained with reference to FIGS. 3A and 3B.

A mouse 11 and a keyboard 12 are connected to an input information control section 14 via an input/output (I/O) circuit 13.

The input information controlling section 14 is connected to a cursor designation position detector 16 of a mouse position coordinates detecting section 15, and to a mouse displacement detector 17. The cursor designation position detector 16 detects the initial position of a cursor, and the mouse displacement detector 17 detects displacement of a mouse cursor from the initial position thereof. The output terminals of the detectors 16 and 17 are connected to the input terminals of an adder 18. The output terminal of the adder 18 is connected to the input terminal of a moved-cursor position detector 19 for detecting the coordinates of a moved cursor.

The output terminal of the moved-cursor position detector 19, i.e., of the mouse position coordinates detecting section 15 is connected to a display area calculation circuit 20 and to a control section 21. The control section 21 is connected to the display device 10. The display area calculation circuit 20 calculates an area required for displaying an icon, from the coordinates of the moved mouse cursor, and outputs a calculation result indicative of the icon display area, to an object-change display area correspondence processor 22. The processor 22 stores data relating to the display area of the moved object or icon, and has an output terminal connected to a read/write (R/W) control circuit 23 and to an object ordering circuit The output terminal of the cursor designation position detector 16 of the mouse position coordinates detecting circuit 15 is connected to a designated area discriminator 25 for discriminating a cursor display area designated by the user. The output terminal of the discriminator 25 is connected to a designated object area discrimination circuit 26, which is connected to memory 27 storing a table showing correspondence between display areas and objects, and compares the discrimination result of the designated area discriminator 25 with the contents of the memory 27, thereby discriminating an object corresponding to the discriminated display area. The output of the circuit 26 is connected to an R-O buffer 29 of a designated object discrimination section 28. The buffer 29 and an buffer 30 are connected to an object retrieval circuit. 31 having an output terminal connected to an O-P-(R) buffer 32.

A memory 33 stores a plurality of objects and a plurality of pictograms corresponding to the objects. The O-P buffer 30 stores those pictograms and objects corresponding to the same now being displayed on the display device which are read out of the memory 33 by the R/W control circuit 23. The object retrieval circuit 31 compares data read from the R-O buffer 29 with data from the O-P buffer 30, thereby retrieving a pictogram designated by the user and storing the same in the buffer 32. The output terminal of the buffer connected to an object/display address table 34 which stores a plurality of objects and a plurality of display addresses corresponding to the objects. The object/display address table 34 is connected to the R/W control section 23 and a display address controller 35.

The display address control circuit 35 is connected to the output terminals of the input information control section 14, and outputs an address for displaying the designated pictogram in a desired position. The output terminals of the circuit 35 and input information control section 14 are connected to a pictogram overlapping control circuit 36 having an output terminal connected to the object ordering circuit 24.

The output terminal of the O-P-(R) buffer 32 of the designated object discriminating section 28 is connected to the input terminals of an object discriminator 37, a pictogram discriminator 38, and a role discriminator 39. The output terminals of the discriminators 37–39 are connected to a transformer 40 for transforming designation information for discriminating the combination of designated icons, into a form suitable for inference processing, hereinafter referred to. The output terminal of the transformer 40 is connected to the write-in terminal of a designated content memory 41 storing designated contents. The read-out terminal of the memory 41 is connected to a pictogram attribute inference section 43, together with the read-out terminal of a knowledge memory 42. The knowledge memory 42 has an initial definition knowledge memory 42a storing predetermined knowledge and a user's definition knowledge memory 42b storing knowledge defined by the user.

The pictogram attribute inference section 43 infers the content of the designated content memory 41, that is, infers the attributes of pictograms indicated by a combination of icon designated by the user on the basis of the information stored in the designated content memory 41 and the knowledge memory 42. The output terminal of the inference section 43 is connected to a rule condition inference section 45 via a buffer 44. The inference section 45 is connected to a rule memory 46 storing data defining the relationship between each combination of pictograms and a function corresponding to the combination. The rule memory 46 has an initially defined rule memory 46a storing predetermined rules and a user's definition rule memory 46b storing a rule defined by the user. The rule condition inference section 45 has an output terminal connected to a function execution section 48 via a function execution control circuit 47. The section 48 stores application programs, utility programs, etc., and execute the program corresponding to a function designated based on a function execution command output from the control section 21.

An object change control circuit 49 is provided changing the contents of the table memory 27 and pictogram memory 33, its input terminal being connected to the input information control section 14, and its output terminals to the display area/object table memory 27 and R/W control circuit 23. A knowledge editor 50 is connected to the input information control section 14, to an edit buffer 51, and to the knowledge memory 42 and rule memory 46 via a knowledge transformer 52. The editor 50 is provided for adding and changing the contents of user's definition knowledge memory 42b and user's definition rule memory 46b.

The operation of the above-described function extraction apparatus will be explained with reference to FIG. 4 and FIGS. 5A–5J.

Figure 5A:
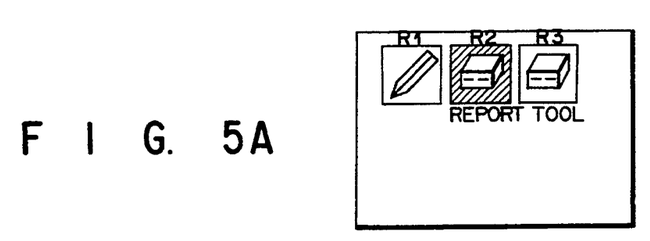
FIGS. 5A-5J are views, showing various display screens for explaining the operation of the function extraction apparatus.

When the power source of the system is turned on, the display device 10 displays a plurality of icons. Then, the cursor is moved to e.g. a report icon, as shown in FIG. 5A, by operating the mouse 11 (step 1), and the button of the mouse 11 is pushed, thereby designating the report icon (step 2). Thereafter, the mouse 11 is further moved with its button being pushed, to move the designated icon (step 3). At this time, information output from the mouse 11 in accordance with movement thereof is input to the input information control section 14 via the I/0 circuit 13. The input information control section 14 supplies the mouse information to the cursor position detector 16 and mouse displacement detector 17 of the mouse position coordinates detector 15. The cursor position detector 16 detects the initial position of the cursor, i.e., the coordinates of the position of the report icon, based on the mouse information, and outputs reference coordinate information. The mouse displacement detector 17 detects the displacement of the cursor from the initial position, and outputs displacement information. The reference coordinate information and displacement information are added to each other by the adder 18, and the resultant adder information is input to the moved cursor coordinate detector 19. The detector 19 detects the coordinates of the moved cursor on the basis of the adder information, and inputs the detected coordinates information to the control section 21 and display area calculation circuit 20. The display area calculation circuit 20 calculates an area required for displaying the report icon moving from the initial position, and stores the calculation result in the object change display area correspondence processor 22.

On the other hand, when the initial position coordinate information is input to the user designation area discriminator 25, the discriminator 25 determines where on the display device 10 the icon designated by a user using a mouse 11 is positioned, for example, in which area R1, R2, or R3 in FIG. 5A it is positioned. If it is determined that the icon designated by the user is positioned in the area R2, the discriminator 25 supplies the designated object area discriminating circuit 26 with data indicative of the area R2. The circuit 26 discriminates as a report an object corresponding to the area R2 from the data stored in the display area/object memory 27, on the basis of the input area data. The circuit 26 then supplies the R-O buffer 29 with the discrimination result, i.e., data indicating the area R2=report. Thus, the icon designated by the user is determined to be report. Subsequently, it is determined what kind of pictogram the object (=report) uses. At this time, a plurality of pictogram/object pairs including a pair of pictogram and object which now are displayed on the display device 10 are read by the R/W control circuit 23 from the memory 33 storing objects and pictograms corresponding to the objects, and are stored in the O-P buffer 30. The object retrieving circuit 31 connected to the buffers 29 and 30 compares the object stored in the buffer 29, with that stored in the buffer 30, retrieves a pictogram corresponding to the designated object (=report), and supplies the retrieval result to the O-P-(R) buffer 32. Thus, the designated object, pictogram corresponding to the object, and initial designation area are determined.

Figure 5B:
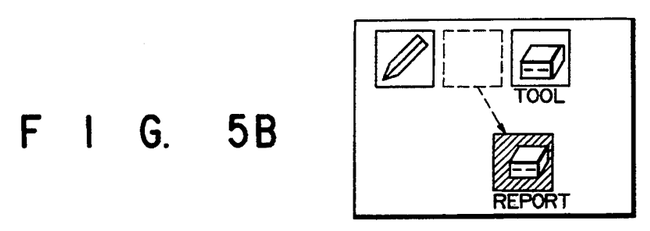
Figure 5C:
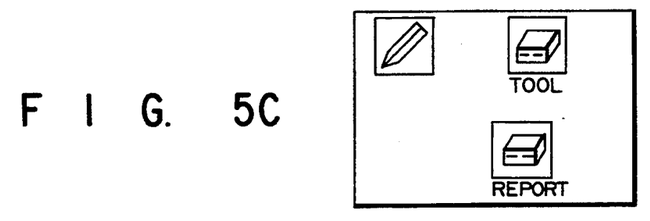

Thereafter, the designated object (=report) and pictogram are read out of the O-P-(R) buffer 32, and stored in the object/display address memory 34. The memory 34 is addressed in correspondence with the position of the moved cursor under control of the display address control circuit 35. In this state, the R/W memory 23 reads, from the memory 33, a pictogram corresponding to the object (=report) stored in the memory 34, and displays the pictogram on that portion of the screen which corresponds to the designated address (FIG. 5B). That is, movement of the designated icon is completed (step 4). Then, the pushed button of the mouse 11 is released and the position of the report icon is fixed, as is shown in FIG. 5C (step 5).

Figure 5D:
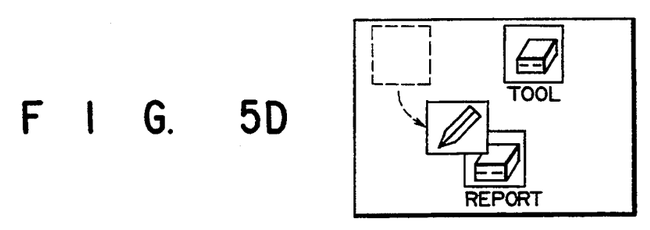

In the next step 6, it is determined whether or not overlapping of icons is completed. In the state shown in FIG. 5C, the icons are not overlapped, so that the mouse 11 is operated to move the cursor to the pencil icon. Thus, the operation is returned to step 1. Thereafter, as is shown in FIG. 5D, the pencil icon is moved to the report icon in a similar manner to the movement of the report icon. That is, the display area of the pencil icon obtained by the display area calculation circuit 20 is compared with that of the report icon stored in the processor 22. Thus, it is detected how the pencil icon is overlapped upon the report icon. Similarly, to further overlap another icon, such as a trash box icon, upon the pencil and report icons, the operation is returned to step 1. In the case of overlapping the pencil upon report icons, the program proceeds to step 7, where it is determined whether or not the order of overlapping has been changed, i.e., whether the role of the icon has been changed from operator to operand or vice versa. In FIG. 5D, the report icon positioned under the pencil icon is the operator, and the pencil icon is the operand.

In the embodiment, when the pencil pictogram serves as the operator, it indicates the operation "to create a document", whereas when it serves as the operand, it means "tool". Similarly, when the drawer pictogram serves as the operator, it indicates the operation "to contain", whereas when it serves as the operand, it means "container." Further, when the trash box pictogram serves as the operator, it indicates the operation "to delete", whereas when it serves as the operand, means "container".

Figure 5E:
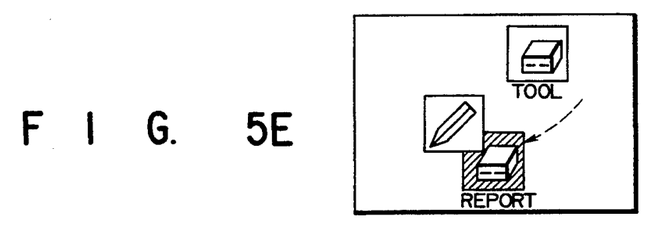
Figure 5F:
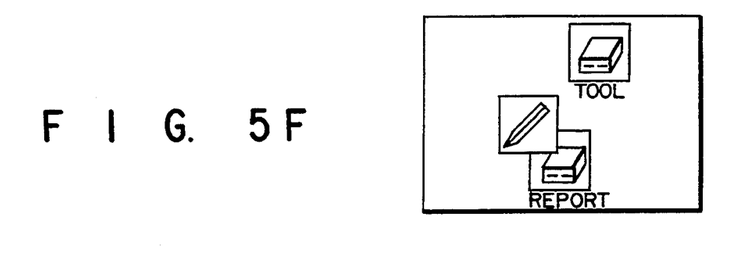
Figure 5G:
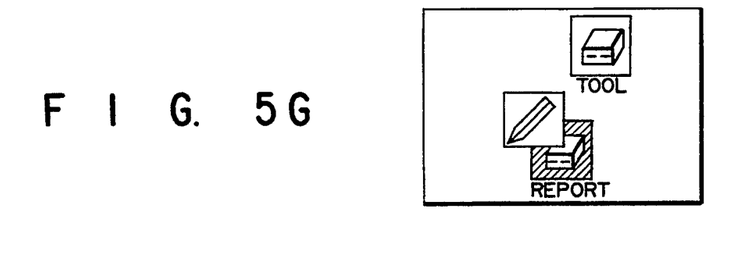
Figure 5H:
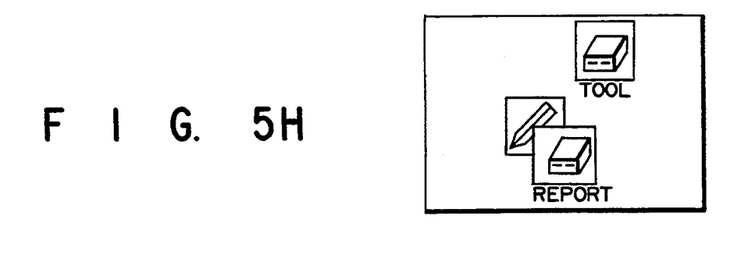

If it is determined that there is no change of role, conforming operation is performed. For example, when the report icon is indicated by the mouse cursor, as is shown in FIG. 5E, the mouse 11 is double-clicked. Data indicative of the double-clicking is supplied to the display address control circuit 35 via the input information control section 14. The circuit 35 responds to the data, and stores in the memory 34 address information for overlapping. As a result, combination of icons, in which the report icon is the operator and the pencil icon is the operand, is confirmed.

Where the role of an icon is changed from the operator from the operand or vice versa, the mouse cursor is moved to the icon whose role should be changed. At this time, when the left button of the mouse is single-clicked, the designated icon comes to the front, whereas when the right button of the mouse is single-clicked, the icon comes to the rear. If the report icon is designated by the cursor as shown in FIG. 5G and the left button is clicked, the report icon comes to the front as shown in FIG. 5H. If the pencil icon shown in FIG. 5F is designated by the cursor and the right button is clicked, it goes to the rear as shown in FIG. 5H. This change of roles is performed by inputting click information, generated by single-clicking the left or right button of the mouse, to the display address control circuit 35 via the input information control section 14, thereby controlling those mask pulses in X and Y directions which are input to the address counter of the circuit 35. The address controlled by the address control circuit 35 in accordance with the overlapping condition of the cursors is transferred to and stored in the object/display address memory 34.

Then, the manner of changing the combination of icons will be explained.

Figure 5I:
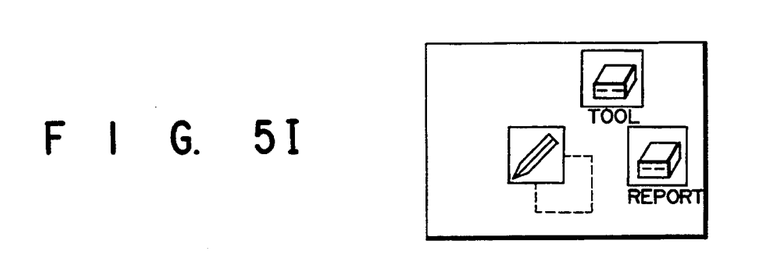
Figure 5J:
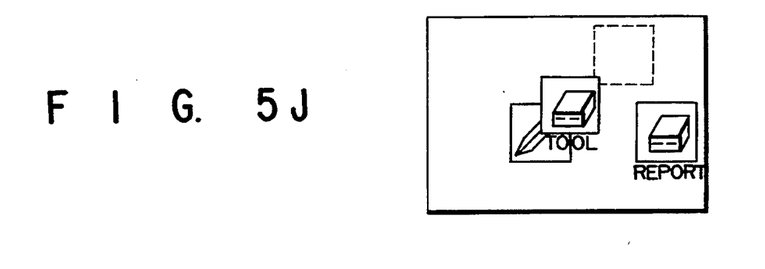

For example, to change the combination of the report icon and pencil icon to that of the pencil icon and tool icon, the cursor is moved to the report icon, and then the mouse 11 is moved with the button thereof being pushed, thereby moving the report icon apart from the position at which the pencil icon overlaps upon the report icon as shown in FIG. 5I. Then, the pushed button is released. Subsequently, the cursor is moved toward the tool icon, and the button of the mouse is pushed when the cursor is put on the icon. Then, the mouse is moved with the button pushed to overlap the tool icon upon the pencil icon as shown in FIG. 5J. When the tool icon is overlapped upon the pencil icon, the above-described confirming operation (double-clicking) is performed, thereby completing the change of the icon combination.

After completion of the movement of the icon and of the change of the icon combination and completion of the confirming operation, inference processing is performed. This inference processing will now be explained.

The object discriminator 37 and pictogram discriminator 38 read in the object and pictogram stored in the O-P-(R) buffer 32, and supply them to the transformer 40. The role discriminator 39 receives a signal output from the object ordering circuit 24 and a plurality of pictograms read out of the buffer 32, and discriminates, based on the order of overlapping the pictograms, whether an object represented by each pictogram is the operator or the operand. The results of the role discrimination are input to the transformer 40. The transformer 40 transforms the input object information, pictogram information, and role information into forms (as shown in FIG. 6) usable in the inference sections 43 and 45. The transformed object, pictogram, and role information are stored in the designated content memory 41. The pictogram attribute inference section 43 receives information from the memory 41 and knowledge memory 42. The memory 42 stores knowledge as shown in FIG. 7, and the inference section 43 infers the attribute of a pictogram indicated by an icon designated by the user, on the basis of the information shown in FIGS. 6 and 7. For example, where the pencil icon is overlapped upon the report icon as shown in FIG. 5D, that is, where the report icon represented by the drawer pictogram serves as the operator, and the pencil icon represented by the pencil pictogram serves as the operand, data indicative of these conditions and expressed as shown in (a) of FIG. 6 are stored in the memory 41. That is, the memory 41 stores data representing an object name "REPORTS", a pictogram "drawer" and a role "operator", and data representing an object name "EDITOR", a pictogram "pencil", and a role "operator". The pictogram attribute inference section 43 compares these data with the pictogram attribute knowledge (FIG. 7) stored in the knowledge memory 42, thereby inferring the attribute of the designated icon. At this time, the role of the "drawer" as the operator and the role of the "pencil" as the operand are inferred based on the knowledge shown in FIG. 7, thereby determining that the "drawer" has an attribute of "to contain" and the "pencil" has an attribute of "tool". The attribute information (a1 and a2 of FIG. 7) and the designated content (a of FIG. 6) of the memory 41 are input to the rule condition inference section 45 via the buffer 44.

The rule condition inference section 45 extracts a function in accordance with a function extraction rule (FIG. 8) read out of a rule memory 46. A rule, indicating that the operator represents "to contain" and the operand represents "tool", is retrieved from rules as shown in FIG. 8. This rule is judged rule 1. Based on the rule 1, a signal indicating the function of "quit EDITOR", i.e. "terminating document edit" is supplied to the function execution control section 47, since the object name of "pencil" is EDITOR. The section 47 supplies the function execution section 48 with a function execution command, thereby terminating editing.

Figure 9A:
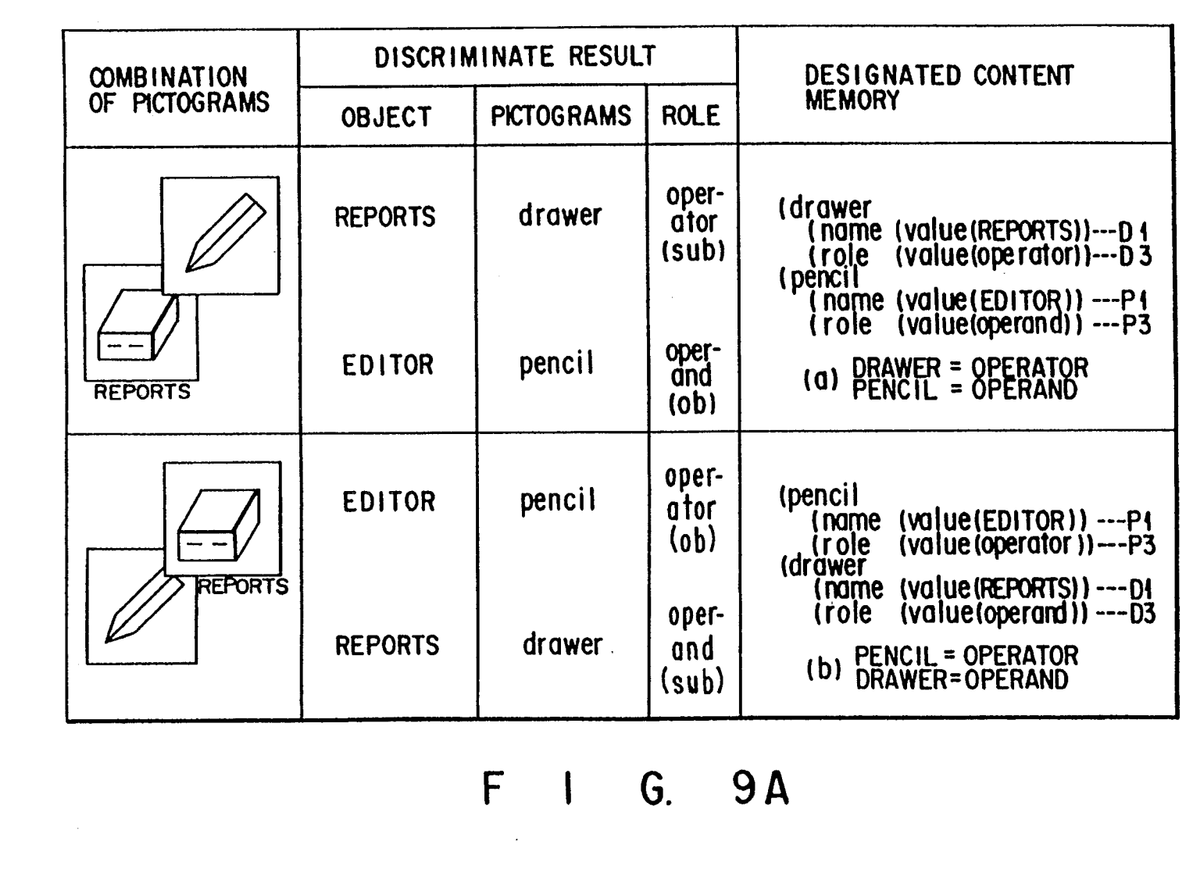
FIGS. 9A and 9B are views, showing tables explaining the function extraction operation.
Figure 9B:
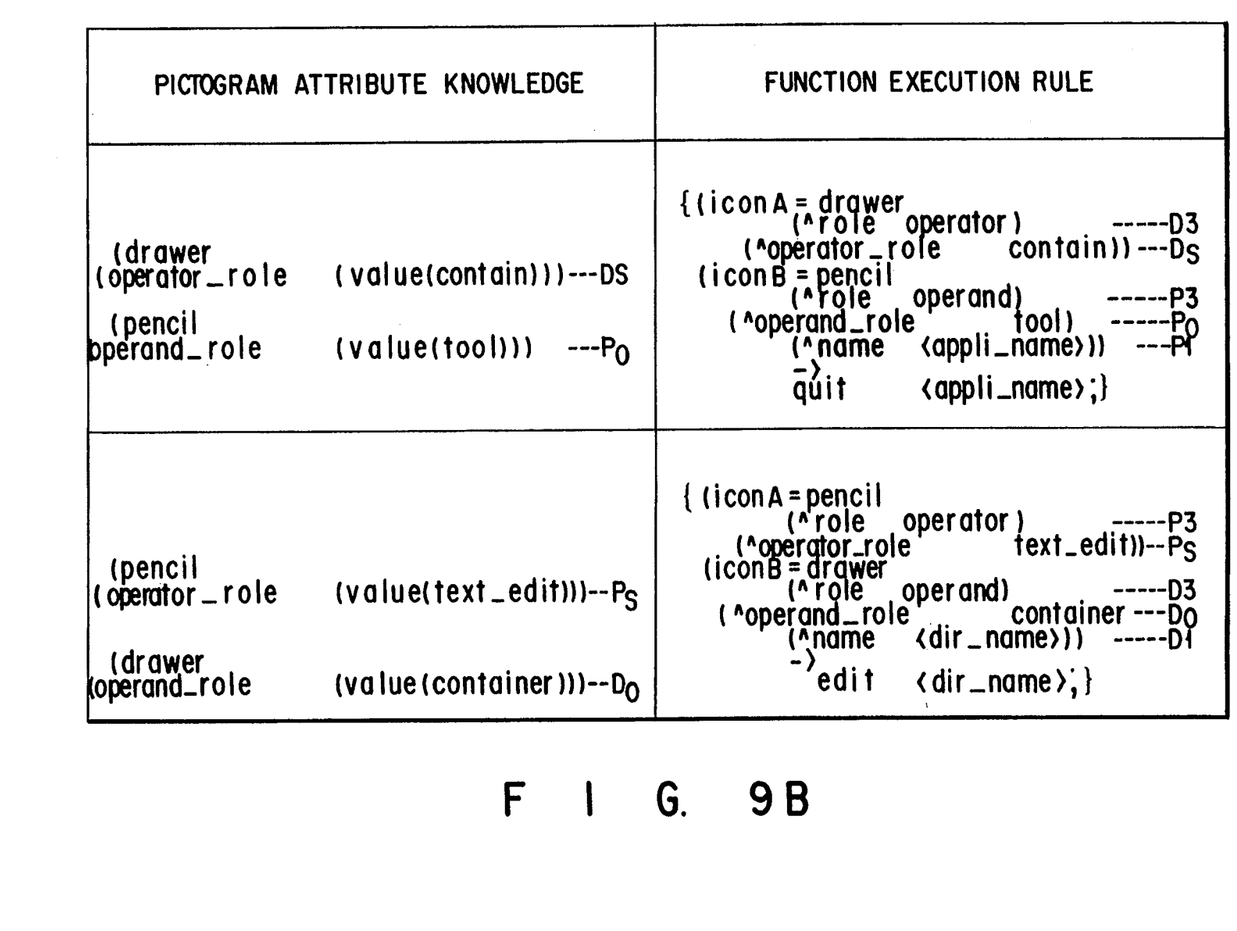

FIGS. 9A and 9B are tables showing the above-described operation. Specifically, the first row shows the case of overlapping the pencil icon upon the report icon. Discrimination results obtained by the discriminators 37-39 are shown in the "discrimination result" box of the row. At this time, the information stored in the designated content memory 41 is shown in the "designated-content storage" box of the row. That is, the role of the "drawer" is the operator, while the role of the "pencil" is the operand. The pictogram attribute inference section 43 infers the attributes of the pictograms based on the above information. The inference results are shown in the "pictogram attribute knowledge" box of the row. The attribute of the "drawer" is inferred "to contain", and that of the "pencil" is inferred to be "tool". The "function execution rule" box of the row shows inferred execution function, i.e., information obtained by inputting the pictogram attribute inference results to the rule inference section 45. The operator role of the "drawer" is "to contain", that of the "pencil" is "tool", and the name of the "pencil" is "EDITOR". Thus, the rule "quit EDITOR" is applied, which means that the function of "terminating the text editing" is inferred.

The second row shows the case of overlapping the report icon upon the pencil icon. Discrimination results obtained by the discriminators 37-39 are shown in the "discrimination result" box of the second row. The information stored in the designated-content memory 41 is shown in the "designated content storage" box. That is, the role of the "pencil" is the operator, while the role of the "drawer" is the operand. The pictogram attribute inference section 43 infers the attributes of the pictograms based on the above information. The inference results are shown in the "pictogram attribute knowledge" box. The attribute of the "pencil" is inferred "to edit a text", and that of the "drawer" is inferred to be "container". A "function execution rule" box shows inferred execution function, i.e., information obtained by inputting the pictogram attribute inference results to the rule inference section 45. The operator role of the "pencil" is "to edit a text", that of the "drawer" is "container", and the name of the "drawer" is "REPORTS". Thus, the rule "edit REPORTS" is applied, which means that the function of "editing a text" is inferred.

The operation of each structural element of the apparatus according to the invention will be explained in detail.

Specifically, the operations of associated structural elements assumed when the report icon is moved from the position shown in FIG. 5A to that shown in FIG. 5B will be explained.

The cursor is moved to the drawer by operating the mouse 11. When the cursor reaches in the area of the pictogram "REPORT icon", the button of the mouse is pushed. The mouse is further moved with the button pushed, thereby moving the REPORT icon to a predetermined position. At this time, the area designated by the user using the cursor is detected by the cursor position detector 16 and designated area discriminator 25. Information indicative of the designated area obtained by the discriminator 25 is input to one of the input terminals of the designated object area discriminator 26. The other of the input terminals of the discriminator 26 is supplied with information extracted from the display-area/object table 27 and indicative of the relationship between the area and object. Accordingly, an object corresponding to the icon positioned in an display area which is to be moved by the cursor is discriminated by the designated object area discriminator 26. Information indicating the relationship between the area, designated by the cursor and discriminated by the discriminator 26, and the object corresponding to the area is stored in the R-O buffer 29. In other words, the buffer 29 stores information as to what the object corresponding to the area designated by moving the cursor is. At this time, the displayed icon corresponds to an pictogram read out of the pictogram file 33. The file 33 has pictogram plates each provided with an image information storing area and 10 an object area storing object information. Information indicative of the objects and their pictograms which are currently displayed on the screen is stored in the O-P buffer 30 via the R/W control section 23.

The object retrieval circuit 31 retrieves the object-/pictogram information stored in the O-P buffer 30 and the area/object information stored in the R-O buffer 29. Retrieval results, i.e., pictogram and area information corresponding to the object designated by the cursor is stored in the buffer 32.

Here, moving a pictogram with the mouse button pushed will be explained in detail.

Information indicating that the display area has been changed by moving the mouse is supplied to the object/changed display area correspondence processor 22 via the display area calculating circuit 20. The processor 22 generates information necessary for designating an object designated by the user and its display area.

In accordance with movement of the mouse by the user, the display area calculating circuit 20 calculates the changed area of a pictogram to be displayed, and the calculation result is supplied to the display address control circuit 35 (via the object/change display area correspondence processor 22). The section 35 has an address counter (not shown), and controls an address necessary for reading the pictogram out of the pictogram file 33. That is, the address stored in the object/display address memory 34 is changed by the display address control section 35. Thus, the pictogram is moved on the screen in accordance with the movement of the mouse with the button pushed. In this state, if the button is released, the address is determined and the pictogram is displayed in a position corresponding to the button-released position of the mouse.

Then, determination as to overlapping of icons will be explained.

An icon to be overlapped on the formerly moved icon is moved toward the latter icon by moving the mouse with the button thereof pushed. The display address of the formerly moved icon is obtained beforehand by the display address control circuit 35.

The object/display address memory 34 stores an address for determining the display position of a icon, and this address is controlled by the display address control circuit 35. The circuit 35 reads out a pictogram file corresponding to the display position of the formerly moved icon, thereby performing address control. When the icon is moved toward the formerly moved icon, it has its address changed by the display address control circuit 35, whereby the display position of the icon just moved is moved. When the icons are overlapped with each other, the control circuit 35 detects, based on a signal output from the object/changed display area correspondence processor 22, that the designated areas are overlapped with each other. Upon detection of this, the control circuit 35 takes preference of reading out a pictogram file corresponding to the just-moved icon in the area in which overlapping has been performed. Accordingly, the just-moved icon is displayed in that area, thereby displaying the overlapping of the icons.

The double-clicking operation for determining the operator and operand will be explained.

To determine, after the overlapping, the combination of icons and determine which one of the overlapped icons the operator (or operand) is, the cursor is moved to one of the overlapped icons, and double-clicking is performed. A signal indicative of the double-clicking is input to the display address control circuit 35 and pictogram overlapping control circuit 36. When the circuit 35 is supplied with the double-clicking signal, the icon designated by the cursor and the other icon are designated as objects to be inferred. When the determination operation is performed, the icon positioned under the other is determined as the operator. To change the operator before the determination operation, the following operation is performed.

When the cursor is put on the icon positioned above the other, and single-clicking of the left or right button of the mouse 11 is performed, the control circuit 36 supplies the object ordering circuit 24 with a signal indicative of change of the overlapping state, thereby changing the order of the objects. In accordance with the change of the order, the object ordering circuit 24 supplies the display address control circuit 35 with a signal for performing address control necessary to reverse the overlapping relationship of the icons. Accordingly, the display address control circuit 35 receives a control signal for taking preference of reading out the pictograms of the objects in the display area corresponding to the object ordering, thereby reversing the overlapping relationship of the icons. At this time, objects, to be taken preference of and corresponding to an area designated by the designated area discriminator 25 at the time of single-clicking, are retrieved by the designated object area discriminator 26 on the basis of the information stored in this display object table 27. Pictograms corresponding to the preferential objects are stored in the O-P-(R) buffer 32, and object information serving as the operator is supplied from the object ordering circuit 24 to the role discriminator 39 after the determination operation.

The above-described display area/object table 27 has a first table covering the standard display areas of icons and a second table covering the display areas of icons moved by using the mouse, the second table being rewritten each time the memory of the object/changed display area correspondence processor 22 is rewritten for each object. Thus, a plurality of pairs of icons, each pair of which comprises icons overlapping with each other, can be formed until the above-described determination operation is performed by double-clicking the button. In this case, the relative relationship in position between icon pairs can be changed by operating the mouse, and further the overlapping states of the icon pairs be changed.

The operation for changing the object corresponding to each of pictograms stored in the pictogram file 33 will be described.

When a cursor is moved to the area of the icon corresponding to an object to be changed among the pictograms and objects which are currently displayed on the display device 10, a mouse 11 is single-clicked, and an object name to be changed is input by the keyboard 12, and when a newly designated object name is input and then a return key is pressed, the object change control circuit 49 changes the object of the display area/object table 27 in response to the input of the object name, and the table of the object/changed display area correspondence processor 22 is rewritten in correspondence with the changed object. Further the object stored in the pictogram file 33 and corresponding to the changed object is changed.

The above change of the object is confirmed by key-in of the keyboard 12.

According to the above invention, if a plurality of icon candidates for icon combinations are displayed on a display screen and the most suitable combination of pictograms is selected among the plurality of icon candidates and confirmed, a desired function can be extracted by using a combination of operator and operand. Also, since the icon is represented by a combination of an object name and a pictogram, the user can specify a desired operator or operand to a plurality of icons and also change the combination of the icons.

In the above-described embodiments, two pictograms are designated so as to execute a function. However, the number of pictograms to be designated is not limited to two, but may be one, three or more. It suffices if various combinations each consisting of any number of pictograms are defined in the function extraction rules.

Though in the above embodiments, the roles of pictograms are determined by a state in which the pictograms are overlapped with each other, the apparatus may be modified such that a pictogram to serve as the operator is determined by single-clicking, and a pictogram to serve as the operand is determined by double-clicking.

In the above embodiments, if the user designates a combination of functional roles which is not described in the function extraction rules, information indicating that a corresponding function does not exist is displayed. However, this may be modified such that if one or more function extraction rules describing role relationships similar to that designated by the user are found, they are displayed as execution function candidates, and the user selects his desired one if it exists.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A function extraction apparatus comprising:
   output process means for displaying a plurality of icons having respective pictograms;
   input means for selectively designating at least two of the plurality of icons displayed by the output process means, and generating input information corresponding to the designated icons;
   designated content-discriminating means for discriminating objects, their pictograms and roles corresponding to the at least two designated icons based on the input information supplied from the input means, wherein said designated content-discriminating means discriminates the roles of the objects corresponding to the at least two designated icons from a plurality of potential roles to which each object may correspond;
   transforming means for transforming the discriminated objects, their pictograms and roles into predetermined information, and outputting the predetermined information as designated-content information;
   designated-content memory means for storing the designated-content information;
   knowledge base means including pictogram knowledge attribute means for storing, as attribute knowledge, a functional role of each reference pictogram, and functional rule knowledge means for storing a plurality of functional rules each defining a function to be executed, on the basis of the reference pictograms and attribute knowledge; and
   function designating means for designating a function to be executed, on the basis of the relationship between the roles of the two objects corresponding to the at least two designated icons by using the designated-content memory means and knowledge base means.

2. The function extraction apparatus according to claim 1, wherein the designated content-discriminating means includes role determination means for determining the role of each of the objects corresponding to the at least two icons designated by the input means, in accordance with an order of designation of the icons.

3. The function extraction apparatus according to claim 2, wherein the role determination means determines that the object of an icon designated first serves as operator having the role of action, and that the object of an icon designated later serves as operand having the role of a tool.

4. The function extraction apparatus according to claim 3, wherein the role determination means includes means for reversing the roles of the icons.

5. The function extraction apparatus according to claim 1, wherein the output process means comprises display means for displaying the at least two icons designated by the input means in a state in which the icons are overlapped upon each other, and the designated content-discrimination means includes means for detecting a state in which the icons are overlapped upon each other, and role determination means for determining that one of the overlapped pictograms which is positioned under the other serves as operator having the role of representing a function, and that the other serves as operand having the role of representing a tool.

6. The function extraction apparatus according to claim 5, wherein the role determination means includes means for reversing the roles of the icons.

7. The function extraction apparatus according to claim 5, wherein the input means has at least one push button, and comprises a movable mouse for outputting an information signal indicative of operation of the push button and movement of the movable mouse, and the role determination means has means for detecting double-clicking of the push button, and means responsive to the detected double-clicking for changing the roles of the pictograms to each other.

8. The function extraction apparatus according to claim 1, wherein the function designation means includes:
   pictogram attribute inference means for inferring the attributes of the pictogram of an icon designated based on the relationship between the pictogram and the role of the pictogram corresponding to the designated-content information read out of the designated-content memory means, and on the attribute knowledge stored in the pictogram attribute knowledge means; and
   rule condition inference means for inferring a function to be executed, based on the attributes inferred by the pictogram attribute inference means and function rule knowledge stored in the function rule knowledge means.

9. The function extraction apparatus according to claim 1, wherein said function designating means comprises means for inferring a function to be executed, on the basis of the relationship between the roles of two objects.

10. A function extraction apparatus comprising:
    output process means for displaying icons having respective pictograms;
    input means for selectively designating a plurality of said icons displayed by the output process means, and generating input information corresponding to the designated icons;
    means for overlapping the pictograms of the designated icons upon each other;
    designated content-discriminating means for discriminating objects and their pictograms of the designated icons, and for discriminating functional role of each of the designated icons from a plurality of potential functional roles of each designated icon on the basis of a state in which the icons are overlapped;
    transforming means for transforming the discriminated objects, their pictograms and roles into predetermined information, and outputting the predetermined information as designated-content information;

designated-content memory means for storing the designated-content information;

knowledge base means including pictogram attribute knowledge means for storing the functional role of each reference pictogram as attribute knowledge, and functional rule knowledge means for storing a plurality of functional rules each defining a function to be executed, on the basis of the reference pictograms and attribute knowledge; and function inference means for designating a function to be executed, on the basis of the relationship between the roles of pictograms corresponding to the icons designated by using the designated-content memory means and knowledge base means.

11. The function extraction apparatus according to claim 10, wherein the designated-content discrimination means includes means for detecting a state in which the pictograms are overlapped upon each other, and role determination means for determining that one of the overlapped pictograms which is positioned under the other serves as operator having the role of representing a function, and that the other serves as operand having the role of representing a tool.

12. The function extraction apparatus according to claim 11, wherein the role determination means includes means for reversing the roles of the pictograms.

13. The function extraction apparatus according to claim 10, wherein the function inference means includes:

pictogram attribute inference means for inferring the attributes of the pictogram of an icon designated based on the relationship between the pictogram and the role of the pictogram corresponding to the designated-content information read out of the designated-content memory means, and on the attribute knowledge stored in the pictogram attribute knowledge means; and rule condition inference means for inferring a function to be executed, based on the attributes inferred by the pictogram attribute inference means and function rule knowledge stored in the function rule knowledge means.

14. A function extraction method comprising:

a step for displaying a plurality of icons having respective pictograms;

a step for selectively designating at least two of the plurality of displayed icons, and generating input information corresponding to the designated icons;

a step for discriminating objects, their pictograms and roles corresponding to the at least two designated icons based on the input information, wherein the roles of are discriminated from a plurality of potential roles to which each object may correspond;

a step for transforming the discriminated objects, their pictograms and roles into predetermined information, and outputting the predetermined information as designated-content information;

a step for storing the designated-content information;

a step for storing, as attribute knowledge, a functional role of each reference pictogram, and for storing a plurality of functional rules each defining a function to be executed, on the basis of the reference pictograms and the attribute knowledge; and a step for designating a function to be executed, on the basis of the relationship between the roles of the two objects corresponding to the at least two designated icons.

15. A function inferring apparatus comprising:

a display for displaying a plurality of pictograms, each corresponding to an object and each having a selectable role of either operator or operand;

combining means for selectively combining a first pictogram from said plurality of displayed pictograms and a second pictogram from said plurality of displayed pictograms on said display thereby selecting roles as operator and operand for the first and second pictograms;

discriminating means, responsive to said combining means, for discriminating the first pictogram, its corresponding object, and its selected role and for discriminating the second pictogram, its corresponding object, and its selected role based upon the selected combination of said first and second pictograms;

attribute inferring means for inferring attributes of the corresponding object and selected role of said first pictogram and of the corresponding object and selected role of said second pictogram; and function inferring means for inferring a function based upon the attributes inferred by said attribute inferring means.

* * * * *